Patented Sept. 1, 1953

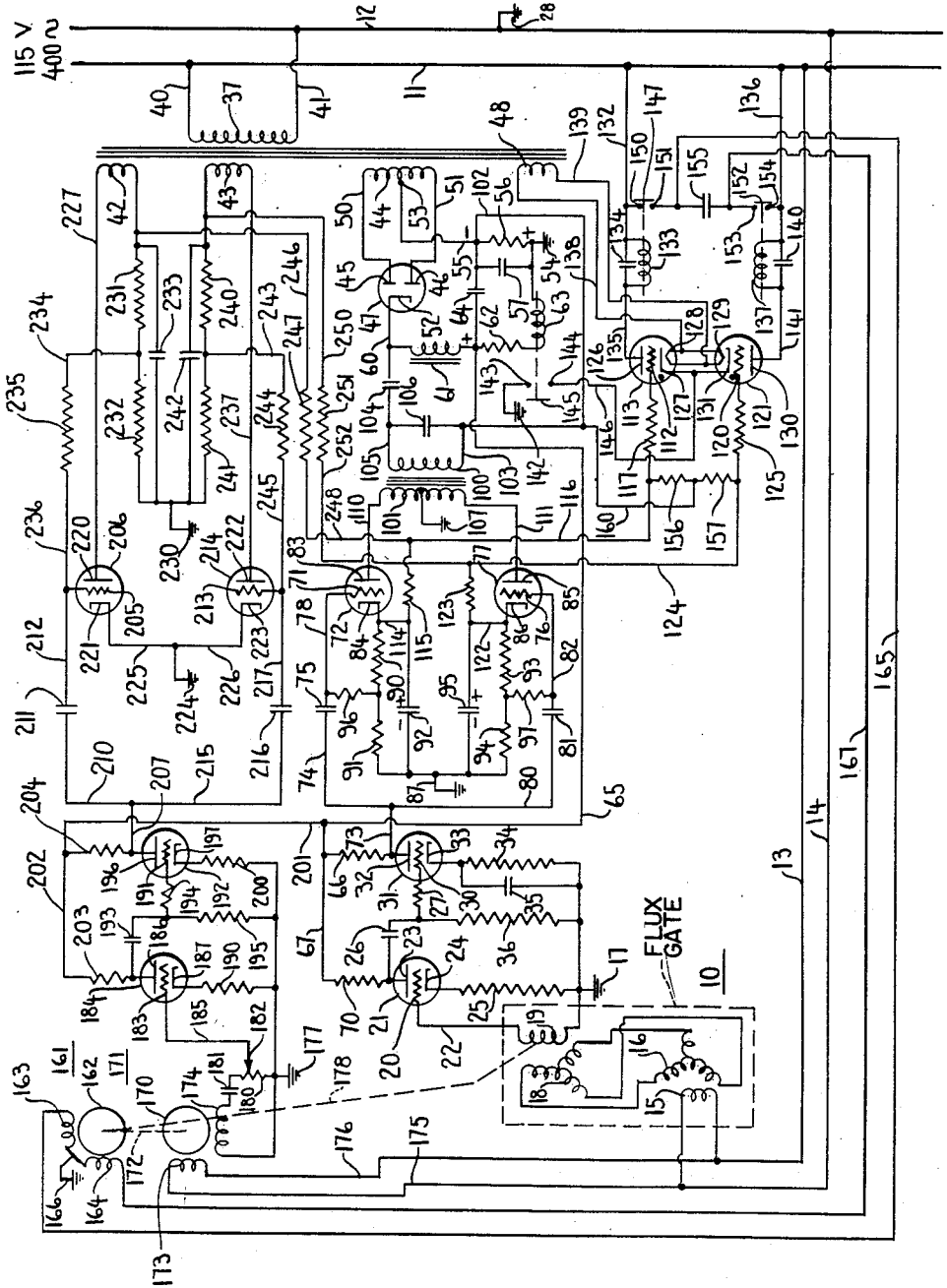

2,651,014

UNITED STATES PATENT OFFICE 2,651,014

ELECTRONIC AMPLIFIER WITH DOUBLE FREQUENCY DISCRIMINATOR

Robert R. Chapman, Minneapolis, Minn., assignor to Minneapolis-Honeywell Regulator Company, Minneapolis, Minn., a corporation of Delaware Application March 24, 1949, Serial No. 83,166

17 Claims. (Cl. 318—283)

1

This invention relates to electronic amplifiers and particularly to amplifiers adapted for use in control systems of the type wherein a device operating at one power supply frequency is controlled in accordance with electrical signals whose frequencies may be the same or different than the supply frequency.

The present invention arose from the necessity of using either a "flux gate" compass of the type disclosed in the Purves et al. Patent 2,383,460 or a "flux valve" compass, either of which is utilized to control aircraft equipment such as motors. Because of the relatively small output of the compass, it is desirable to employ an amplifier between the compass and the motor for controlling the same. These "flux gate" and "flux valve" compasses have an output voltage of twice the frequency of the supply voltage so that difficulties are encountered in attempting to use the same periodically varying power supply for the compass, the amplifier and the motor.

Where it is desired to also use an anti-hunting signal in controlling the motor, the problem becomes even more difficult since such anti-hunting signals are generally of the same frequency as the power supply for the motor. Thus, it is necessary to provide an amplifier which is capable of causing operation of a controlled motor when the signals thereto comprise a signal having a frequency that is the same as the power source energizing the motor and a signal which is of a frequency other than that of the power source.

It is therefore an object of the invention to provide an amplifier capable of utilizing equipment designed for a particular frequency to operate under the control of a signal of twice that frequency.

Another object of the invention is to provide an arrangement in which a motor operated with current of a first frequency is controlled by two signals, one of the first frequency and the other of a second frequency.

A further object of the invention is to provide an arrangement such as set forth in the immediately preceding object in which the signal of the first frequency is produced by operation of the motor for anti-hunting purposes.

A still further object is to provide an arrangement in which a compass having a relatively high frequency signal output controls a motor operated with current of a lower frequency.

A still further object is to provide such an arrangement in which the motor is further controlled by the signal output of a velocity generator driven by the motor and having a fre-

2 quency the same as that of the motor energizing current.

Still another object of the present invention is to provide an amplifier which is phase discriminating at a fundamental frequency and at a frequency which is a harmonic thereof.

A still further object of the present invention is to provide an amplifier of the type set forth in the immediately preceding object which controls a motor operating at the fundamental frequency.

These and other objects of the present invention will be understood upon a consideration of the following specification, claims and drawing.

The single figure is a diagrammatic showing of the amplifier of the present invention as it is associated with a controlled motor 161 and a "flux gate" compass 10. The amplifier is operative to sense unbalance signals from the compass and reversibly control the motor assembly 161 in accordance with those signals. The operation of the motor results in adjustment of a portion of the compass for alignment purposes and will operate until there no longer is an unbalance voltage in the compass.

The "flux gate" compass 10 has a primary or exciter winding 15, secondary or pickup coils 16, a receiver stator 18 and a receiver rotor 19, the latter two of which combine to form a "synchro" transformer. The exciter 15 is energized by a suitable source of power connected thereto by input lines 11 and 12 and leads 13 and 14. These input lines lead to a suitable source of power, for example, a 400 cycle, 115 volt power supply, not shown. The exciter 15 and pickup coils 16 are mounted so as to be intersected by the earth's magnetic field. The excitation from exciter 15 and the earth's magnetic field produce a varying amount of saturation in the cores of windings 16 depending upon their position in the earth's magnetic field. The saturation in the cores of the coils 16 result in the appearance of harmonics in the coils with the second harmonic being predominant. The fundamental frequency is cancelled out because of the position of the exciter with respect to the coils and thus the main output from the coils 16 will be 800 cycles with a 400 cycle excitation voltage on exciter 15. This output voltage from coils 16 is applied to the receiver stator 18 which will induce a voltage in rotor 19 if it is displaced from an electrically balanced or null position. When there is an unbalance signal, it is desired that the amplifier of the present apparatus detect this and cause operation of the motor assembly 161 which will, in turn, drive the receiver rotor 19 to a null position where there will be no output from the rotor 19.

One of the output terminals of receiver rotor 19 of compass 10 is grounded at terminal 17. The other output terminal of the receiver rotor 19 is connected to grid 20 of tube 21 through lead 22 so that upon an 800 cycle signal appearing on rotor 19 there will be an input to tube 21. In addition to a control electrode 20, tube 21 has an anode 23, a cathode 24 and a filament, not shown. The cathode 24 is connected to ground terminal 17 through a resistor 25 to obtain a desired self bias on the cathode 24 with respect to grid 20. The 800 cycle input is amplified by tube 21 and the output therefrom is connected between the anode 23 and a grid 30 of tube 31 by a capacitor 26 and a resistor 27. The purpose of resistor 27 is to prevent distortion of the signal impressed on the input circuit of tube 31 as it is amplified by the tube. This tube has in addition to a grid 30, an anode 32, a cathode 33 and a filament heater, not shown. When a signal is impressed on the input circuit, a voltage drop results across a grid leak resistor 36 which is connected between grid 30 and ground through resistor 27. Cathode 33 is connected to ground through resistor 34, the latter of which has a by-pass capacitor 35 in parallel therewith. If the input signal to grid 30 should be of appreciable magnitude the grid may be driven positive with respect to the cathode and draw grid current. To prevent distortion, the resistor 27, which is a grid current limiting resistor, limits the voltage swing of the grid to predetermined limits. Voltage amplification stages of this type are well known in the art and form no part of the invention.

A transformer having a primary 37, connected to power leads 11 and 12 through leads 40 and 41, has a plurality of secondaries 42, 43, 44 and 48 supplying power to the amplifier.

Transformer secondary 44 furnishes the power supply for tubes 21 and 31. The voltage across secondary 44 is rectified by full wave rectifier tube 47 having anodes 45 and 46, a cathode 52 and a filament, not shown, before being impressed across tubes 21 and 31. The circuit from transformer secondary 44 through rectifier tube 47 for rectifying the voltage is as follows: from the terminals of transformer secondary 44, through leads 50 and 51, anodes 45 and 46, cathode 52, lead 60, choke coil 61, capacitor 64, having resistor 62, relay winding 63 and resistor 56 in parallel therewith, and lead 55 to a center tap 53 on transformer secondary 44. Resistor 56 has a capacitor 57 in parallel therewith. The choke coil 61 is to filter out the A. C. component of the direct current in the output from the tube 47 so that a unidirectional voltage will be present between lead 65 and ground with the voltage being of such polarity that lead 65 will be positive with respect to ground terminal 54. The positive voltage on lead 65 is applied to the anode of tube 21 by a connection through lead 67 and resistor 70. It is also applied to the anode of tube 31 by a connection including resistor 66. The cathodes of each of devices 21 and 31 are connected to ground terminal 17 through their respective cathode resistors 25 and 34.

It can thus be seen that the full wave rectifier tube 47 in combination with transformer secondary 44 is the unidirectional power supply furnishing a voltage across the anodes and cathodes of tubes 21 and 31 for the operation of these tubes. Filter capacitors 64 and 57 eliminate an appreciable portion of the ripple of the voltage in the output of the rectifier which might otherwise be applied to the anodes of the voltage amplification stages.

As has been explained previously, the signal input on the grid of tube 21 has a frequency of 800 cycles. With unidirectional voltage impressed across the anode and cathode, the output from the tube, as a result of the signal, will also have a frequency of 800 cycles. This 800 cycle output from tube 31 is impressed on a grid 71 of tube 72 through leads 73 and 74, blocking capacitor 75 and lead 78. The output of tube 31 is also impressed on a grid 76 of a tube 77 through leads 73 and 80, blocking capacitor 81 and lead 82. Since they are connected to the same output from tube 31, the phasing on the grids 71 and 76 is the same. Tube 72 has in addition to the control electrode 71, an anode 83, a cathode 84 and a filament, not shown. Tube 77 has, in addition to grid 76 an anode 85, a cathode 86 and a filament, not shown. Tubes 72 and 77 may, of course, form two halves of a double triode tube.

Cathode 84 of tube 72 is connected to a ground terminal 87 through resistors 90 and 91 having a capacitor 92 in parallel therewith. Cathode 86 of tube 77 is connected to ground terminal 87 through resistors 93 and 94 having a capacitor 95 in parallel therewith. The capacitor 92 in parallel with the cathode resistors 90 and 91 of tube 72 and capacitor 95 in parallel with the cathode resistors 93 and 94 of tube 77 are filter capacitors and result in the resistors having a direct voltage impressed thereacross, the polarity of which is positive at the respective cathode connections and negative at the respective ground connections. A feedback circuit from the cathode circuit of tube 72 to grid 71 of tube 72 is connected from cathode 84 through resistors 90 and 96 and lead 78 to grid 71. A feedback circuit from the cathode circuit of tube 77 to grid 76 of tube 77 goes from cathode 76 through resistors 93 and 97 and lead 82 to grid 76. These feedback circuits are to provide bias for tubes 72 and 77 and maintain the grids within predetermined limits so that increases in control signal over a desired range will cause increases in plate current until a desired point of saturation is reached, when further increase in input signal will cause no increase in tube current.

The anode supply for tubes 72 and 77, which must have an 800 cycle frequency because the signal is of 800 cycles is obtained from a transformer having a primary 100 and a secondary 101. Transformer primary 100 is connected across the full wave rectifier tube 47 with one terminal of the primary connected to the anodes 45 and 46 through leads 103, 102 and 55, center-tap 53 on transformer secondary 44, the upper and lower halves of transformer secondary 44 and leads 50 and 51. The other terminal of the transformer primary 100 is connected to the cathode 52 through lead 105, capacitor 104 and lead 60. A capacitor 106 is connected across transformer primary 100.

The voltage from transformer secondary 44 after being rectified by tube 47 is a unidirectional voltage having an 800 cycle ripple. This ripple voltage appearing in the rectifier output, when impressed across capacitors 104 and 106 and transformer primary 100 connected to form a series-parallel resonant circuit, is so acted on by this resonant circuit as to result in an 800 cycle sine wave being impressed across the transformer primary. Capacitor 104 also blocks the direct current output from the full wave rectifier to prevent it from flowing through the transformer primary winding 100.

Transformer secondary 101 is center-tapped to ground at terminal 107. Anodes 83 and 85 of tubes 72 and 77 are connected to opposite terminals of transformer secondary 101 through leads 110 and 111 respectively. The output of tube 72 is applied to grid 112 of tube 113, by a connection including lead 114 connected to cathode 84, resistor 115, lead 116 and resistor 117. The output from tube 77 is applied to grid 120 of tube 121, by a connection traced from cathode 86 of tube 77 through lead 122, resistor 123, lead 124 and resistor 125. Tubes 113 and 121 are shown in the drawing to be of the thyratron type, though it is to be understood that any suitable amplifying device may be used. Thyratrons 113 and 121 form a direct current discriminator stage. Thyratron 113 has, in addition to grid 112, an anode 126, a cathode 127 and a filament 128 while thyratron 121 has, in addition to grid 120, an anode 130, a cathode 131 and a filament 129. Filaments 128 and 129 are tied together and are energized by transformer secondary 48 through leads 138 and 139.

Series resistors 156 and 157 are connected across leads 116 and 124. The junction between resistors 156 and 157 is connected to ground terminal 54 through leads 102 and 160 and resistor 56 having the capacitor 57 in parallel therewith. Resistors 117 and 125 are grid current limiting resistors.

Anode 126 of tube 113 is energized from power lead 11 through lead 132, relay coil 133, having a capacitor 134 in parallel therewith, and lead 135. Anode 130 of tube 121 is energized from power lead 11 through lead 136, relay coil 137, having a capacitor 140 in parallel therewith, and lead 141. Cathodes 127 and 131 are connected together and are connected to a ground terminal 142 through a lead 146 and contacts 143 and 144 adapted to be shorted by a movable contact 145, the latter of which is actuated by coil 63. The purpose of the relay contact in this cathode circuit is to prevent any possible firing of either of the thyratrons until the filaments thereof have had an opportunity to heat up. The relay contacts 143 and 144 will not make connection with contact 145 until the full wave rectifier tube 47 has warmed up and current is flowing therethrough. When the rectifier tube 47 does conduct it will cause energization of relay winding 63 in a circuit that may be traced from transformer secondary 44 through leads 50 and 51 to anodes 45 and 46, cathode 52, lead 60, choke coil 61, resistor 62, relay winding 63, resistor 56 and lead 55 to transformer center-tap 53.

Upon operation of rectifier 47 a unidirectional voltage is impressed across resistor 56 of such polarity that the lower or ground end of the resistor, as positioned in the drawing, will be positive with respect to the upper end. The unidirectional voltage on this resistor is applied to the grids 112 and 120 of tubes 113 and 121, respectively, as a bias voltage by a circuit traced from the negative or upper end of resistor 56 through leads 102 and 160 to the junction of resistors 156 and 157. The resistor 156 is connected to the grid 112 by resistor 117 while the resistor 157 is connected to the grid 120 by a resistor 125. Resistors 156 and 157 act as summing and isolating resistors to add the negative bias from resistor 56 and the output signal from tubes 72 and 77 to control the current flow in tubes 113 and 121 without affecting operation of tubes 72 and 77, as will be explained in detail later.

Relay coil 133 connected in the output circuit of tube 113 operates a movable contact 147 normally biased out of engagement with a pair of fixed contacts 150 and 151, by means not shown. Relay coil 137 connected in the output circuit of tube 121 operates a movable contact 152 normally biased out of engagement with a pair of fixed contacts 153 and 154, by means not shown. A capacitor 155 acts as a phase shifting capacitor in the energizing circuit of motor 161.

The aligning motor 161 has a rotor 162 and field windings 163 and 164. Assuming that movable contact 147 is closed against the fixed contacts 150 and 151, field winding 163 is connected across the power line leads 11 and 12 in a circuit traced from power lead 11 through lead 132, fixed contact 150, movable contact 147, fixed contact 151, and lead 165 to field winding 163, ground terminals 166 and 28 to power lead 12. The field winding 164 is connected across the power line leads 11 and 12 in a circuit traced from power lead 11 through lead 132, fixed contact 159, movable contact 147, fixed contact 151, capacitor 155 and lead 167 to field winding 164, ground terminals 166 and 28 to power lead 12. It is seen that the energizing circuit for field winding 164 passes through phase shifting capacitor 155 to shift the phase of the energizing voltage of field winding 164 90° with respect to the energizing voltage of field winding 163 and so cause rotation of rotor 162.

Rotation of rotor 162 of aligning motor 161 causes rotation of rotor 170 of velocity generator 171 since said motor is connected thereto by a suitable mechanical connection 172. Velocity generator 171 has a pair of field windings 173 and 174. Field winding 173 of velocity generator 171 is continuously energized from the power source leads 11 and 12 by a circuit traced from lead 11 through leads 13 and 176, field winding 173, and leads 175 and 14 to power lead 12. Rotation of rotor 170 of velocity generator 171 by motor 161 causes a voltage to be induced in field winding 174. This voltage is proportional in magnitude and phase to the speed and direction of rotation of rotor 162 and the frequency will be that of the power source, for example, 400 cycles. One terminal of field winding 174 is connected to ground terminal 177 while the other terminal of field winding 174 is connected to an authority potentiometer 180 through a capacitor 181. Capacitor 181 is a blocking capacitor providing an open circuit for any unidirectional voltage which might arise in field winding 174. Wiper arm 182, on potentiometer 180, is connected to a grid 183 of tube 184 through lead 185. The position of the wiper arm 182 on potentiometer 180 determines the amount of signal voltage induced in field winding 174 which will be fed to tube 184. This will be described in greater detail later in the specification.

Tube 184 has in addition to grid 183, an anode 186, a cathode 187 and a filament, not shown. Cathode 187 is connected to ground terminal 177 through a resistor 190 which is used to obtain a desired self bias between the grid 183 and cathode 187.

The output of tube 184 is impressed on grid 191 of tube 192 by a connection from anode 186 through capacitor 193 and resistor 194. The junction between capacitor 193 and resistor 194 is connected to ground terminal 177 by resistor 195, which is a grid leak resistor.

Tube 192 has in addition to control electrode an anode 196, a cathode 197 and a filament, not shown. Cathode 197 is connected to ground terminal 177 through resistor 200 used to obtain a desired self bias between the grid 191 and cathode 197.

The anode voltage supply for tubes 184 and 192 is obtained from full wave rectifier 47 by a connection from the cathode 52, lead 60, choke coil 61, leads 65, 201 and 202, to the junction of resistors 203 and 204, and from there to the respective anodes 186 and 196.

The output of tube 192 is connected to grid 205 of tube 206 by leads 207 and 210, capacitor 211 and lead 212. The output of tube 192 is also connected to a grid 213 of tube 214 by leads 207 and 215, capacitor 216 and lead 217. It will be seen that the phase of the signal voltages impressed on grids 205 and 213 are the same since they are taken from the same point in the output of amplifier tube 192.

Tube 206 has, in addition to grid 205, an anode 220, a cathode 221 and a filament, not shown. Tube 214 has, in addition to grid 213, an anode 222, a cathode 223 and a filament, not shown. Cathodes 221 and 223 are connected to ground terminal 224 through leads 225 and 226 respectively.

The anode voltage supply for tube 206 is obtained from transformer secondary 42 through lead 227. The other end of transformer secondary 42 is connected to ground terminal 230 through resistors 231 and 232. A capacitor 233 is connected in parallel therewith. The junction between resistors 231 and 232 is tied to grid 205 in a feedback circuit through lead 234, resistor 235 and lead 236. The anode voltage supply for tube 214 is furnished from transformer secondary 43 through lead 237. The other terminal of transformer secondary 43 is connected to ground terminal 230 through resistors 240 and 241 and a capacitor 242 is connected in parallel with said resistors. The junction between resistors 240 and 241 is connected to grid 213 in a feedback circuit through lead 243, resistor 244 and lead 245. These feedback circuits are to provide a feedback signal for tubes 206 and 214 to maintain the grids within predetermined limits so that increases in control signal over a desired range will cause increases in plate current until a desired point of saturation is reached when further increases in input signal will cause no increase in tube current.

Capacitors 233 and 242, placed in parallel with resistors 231 and 232 and 240 and 241 respectively, are filter capacitors which by-pass alternating currents flowing in the circuit and result in a unidirectional voltage being impressed across these resistors. The output voltage from tube 206 is connected to grid 112 of thyratron 113 in a circuit traced from anode 220 through lead 227, transformer secondary 42, lead 246, resistor 247, leads 248 and 116 and resistor 117 to grid 112. The output voltage from tube 214 is impressed on grid 120 of thyratron 121 in a circuit traced from anode 222 through lead 237, transformer secondary 43, lead 250, resistor 251, leads 252 and 124 and resistor 125 to grid 120. These output voltages will be unidirectional voltages.

Tubes 206 and 214, with their associated components and circuits form an alternating current discriminator stage. The tubes, as connected to their respective secondaries, are adapted to become conductive, with an input signal present on the grids, on alternate half cycles of the power supply, with the conduction dependent upon the phasing of the input signal to the respective grids. If the phasing of the voltages between grid and cathode and anode and cathode of tube 206 is such that the voltages on both grid and anode with respect to the cathode will be on the positive portion of the cycle simultaneously, the phasing of the voltages between grid and cathode and anode and cathode of tube 214 is such that when the voltage on the grid with respect to the cathode is on the positive portion of the cycle the voltage on the anode with respect to the cathode is on the negative portion of the cycle. Under these circumstances tube 206 will be more conductive on the half cycle during which its anode is positive with respect to its cathode than will tube 214 on the following half cycle. As the resultant voltages across the respective output networks for the two tubes will be proportional to the conduction of the tubes, the voltage drop across resistors 231 and 232 will be greater than that across resistors 240 and 241. If the input signal voltage applied to the grids 206 and 214 is of the opposite phase with respect to the voltages between anodes and cathodes to that condition described above it is obvious that the voltage across resistors 240 and 241 will be greater than that across resistors 231 and 232. It is thus seen that the voltage drops across resistors 231 and 232 and across resistors 240 and 241 are dependent upon the phasing of the input signal to the grids of tubes 206 and 214 with respect to the voltages between the anodes and cathodes of the tubes. Further, the right hand terminals of resistors 231 and 240, as seen in the drawing, which are connected to the respective anodes, will be more or less negative with respect to ground in accordance with the phasing of the input signal. This is true because, as can be seen in the drawing, resistors 231 and 232 are connected in series, as are resistors 240 and 241, with the left hand terminals of resistors 232 and 241 connected to a common ground and the electron flow through the tubes passing from cathode to anode, the electron flow will be from right to left across the resistors, resulting in the right hand terminals of resistors 231 and 240 being negative with respect to ground and by the amount of the voltage drops across resistors 231 and 232 and across resistors 240 and 241. This varying negative voltage is used in controlling tubes 113 and 121, as will be understood from the discussion following.

When either tube 206 or tube 214 conducts, a negative output voltage is applied on grid 112 or 120 of thyratron 113 or 121 through resistors 247 and 117 or 251 and 125 to tend to cause that thyratron to become nonconductive. Upon conduction of tube 72, the output voltage from tube 72 is applied to grid 112 of thyratron 113 by a circuit traced from cathode 84 through lead 114, resistor 115, lead 116, and resistor 117 to grid 112. The output voltage from tube 206, upon conduction thereof, is applied to grid 112 by a circuit traced from anode 220 through lead 27, transformer secondary 42, lead 246, resistor 247, leads 248 and 116, and resistor 117 to grid 112. Thus, both a positive and a negative signal are seen to be impressed upon grid 112 when both tubes 72 and 206 conduct simultaneously. Resistors 115 and 247 have been put into the circuits to act as isolating resistors to prevent signals from tube 72 from affecting operation of tube 206 and vice versa. Resistors 123 and 251 in like manner serve as isolating resistors for tubes 77 and 214.

Let it be assumed that there is a signal output from the compass 10, due to a displacement of rotor 19 from the null point, which is of such a phase as to cause tube 72 to conduct on alternate half cycles. That is, the grid 71 of tube 72 is positive during the same half cycle as anode 83. With this phasing, tube 77 does not conduct because, during those half cycles at which grid 76 is positive, anode 85 is negative and on the alternate half cycles, when anode 85 is positive, grid 76 is negative and there is, therefore, no conduction during the entire cycle. Let it also be assumed that this apparatus has been operating for some time and that movable contact 145 is making contact with fixed contacts 143 and 144 to complete the connection to ground from the cathodes 127 and 131 of thyratrons 113 and 121. With tube 72 conducting during alternate half cycles a unidirectional voltage is developed across resistors 90 and 91, which voltage is filtered by capacitor 92. The cathode 84 of tube 72 is positive with respect to ground terminal 87 and therefore a positive signal is impressed on grid 112 of thyratron 113.

A unidirectional voltage of positive polarity is now impressed on grid 112 of thyratron 113. On the half cycle of the periodically varying power supply, when anode 126 of thyratron 113 is positive, relay coil 133 is energized and capacitor 134 in parallel with relay coil 133 is charged. This charge on capacitor 134 leaks off through relay coil 133 during the following half cycle to keep the relay energized to maintain movable contact 147 closed against fixed contacts 150 and 151. With movable contact 147 making contact with fixed contacts 150 and 151 the aligning motor 161 is energized as has been explained above. Rotor 162 of aligning motor 161 begins to rotate, picking up speed with increased time of energization of the field winding. The rotor 170 of velocity generator 171 driven by rotor 162 commences to rotate at the same rate as the rotor. A gradually increasing alternating voltage is therefore induced in field winding 174 to cause an increasing alternating voltage to be impressed across potentiometer 180. This signal is amplified through tubes 184 and 192 and is impressed on grid 205 of tube 206 as a voltage which is in phase with the voltage on anode 220 of tube 206 causing tube 206 to conduct. At the same time aligning motor rotor 162 will be rotating receiver rotor 19 with respect to receiver stator 18 in the compass 10 to reduce the signal output from the compass to the tube 21.

When the voltage on grid 205 is in phase with the voltage on anode 220 the voltage on grid 213 is out of phase with the voltage on anode 222 of tube 214 because the voltages on the anodes are in opposition to each other while the voltages on the grids are in phase. Therefore tube 214 does not conduct. During the alternate half cycles when tube 206 conducts a voltage drop is developed across resistors 231 and 232 and a charge is built up across capacitor 233 which leaks off through resistors 231 and 232 during the half cycles when tube 206 is not conducting. The voltage on the junction of resistor 231 and transformer secondary 42 is negative with respect to ground and therefore a negative voltage is impressed upon grid 112 of thyratron 113 to combine with the positive voltage impressed on grid 112 by tube 72.

As the speed of the rotor 170 of velocity generator 171 increases, increasing the voltage across potentiometer 180, the voltage on grid 205 increases in a positive direction to increase the conduction of tube 206 to cause an increasingly negative voltage to be impressed upon grid 112 to gradually overcome the positive voltage which is being impressed upon this grid by tube 72. At the same time the positive voltage being impressed on the grid 112 by tube 72 is decreasing, assuming the signal output from coils 16 remains the same, because motor 161 is connected to receiver rotor 19 through mechanical connection 178 and operation of motor 161 causes rotation of receiver rotor 19 in such a direction as to decrease the signal induced into rotor 19 by stator 18 and thus decrease the signal from the compass to the amplifier. When the negative voltage on grid 112, due to the conduction of tube 206 overcomes the positive voltage on grid 112, due to conduction of tube 72, tube 113 stops conducting and relay coil 133 is deenergized, causing movable contact 147 to break contact with fixed contacts 150 and 151 to deenergize the circuit to field windings 163 and 164 of aligning motor 161. When this happens the rotor 162 of the motor slows down as does the rotor 170 of the velocity generator. This causes the induced voltage in field winding 174 of the velocity generator to become less and less, reducing the voltage across potentiometer 180. This reduced potential being impressed on grid 205 of tube 206 causes reduced conduction of tube 206 to lessen the magnitude of the negative voltage impressed by this tube on grid 112 of the thyratron.

When the velocity generator signal decreases, its magnitude will tend to go to a value that is less than the unbalance signal from the compass 10. This will result in the negative voltage from tube 206 becoming less in magnitude than the positive voltage from tube 72. When the negative voltage on grid 112 due to tube 206 becomes smaller in magnitude than the positive voltage on grid 112, due to tube 72, the thyratron 113 again conducts to again close the contact 147 with contacts 150 and 151 to in turn energize the field windings of the aligning motor and cause the rotor 162 to again begin rotating and turn the rotor 170 of the velocity generator. This in turn builds up the induced voltage in field winding 174 of the velocity generator which operates to increase the negative signal on grid 112 of the thyratron to cause the thyratron to again move to cutoff. This operation results in a "pecking" action on the part of the relay and the resultant energization of the motor causes the rotor 19 to be moved to a null position where there is no output from the rotor 19.

If the direction of unbalance in compass 10 were opposite the unbalance assumed above, the phase of the signal voltage from the compass would be reversed, causing operation of tubes 77 and 121. Operation of tube 121 energizes relay coil 137 to close contact 152 against contacts 153 and 154 and energizes motor 161. This results in the velocity generator rotor 170 and receiver rotor 19 being driven in the opposite direction by motor 161. Tube 214 will now be conductive rather than tube 206 because of the reverse phasing of the output from the velocity generator. The output voltage from tube 214 is compared with that of tube 77 to control tube 121. As before, the motor 161 will drive the rotor 19 into a null position by the controlling of the energization of relay 133. This control, as the null point is approached will be similar to the "pecking" action described above.

If the wiper arm 182 of the authority potentiometer 180 were moved toward the grounded end of the potentiometer, a much smaller voltage from the field winding 174 of velocity generator 171 would be applied to the amplifier. Under this situation, the relay which is energized by a particular unbalance signal would remain energized for a longer period of time until the signal from the compass were reduced sufficiently that the velocity generator signal voltage would overcome the compass signal voltage on either of grids 112 or 120.

If the wiper arm 182 were moved to the end of potentiometer 180 connected to ground 177, so that there would be no velocity generator signal applied to the amplifier, there would be no pecking action at all and the system would hunt around a balance point due to the inertia of the apparatus. If wiper arm 182 were moved to the opposite end of potentiometer 180 from ground 177 the pecking action would be very rapid because the induced voltage from the velocity generator picked off by wiper 182 would rise much more rapidly than if the wiper were near the ground end of potentiometer 180.

Receiver stator 18 may be mounted on a directional gyro on which a precession motor is mounted. Once rotor 19 has been rotated by aligning motor 161 so that compass 10 is aligned the aligning motor may be switched out of the circuit and the precession motor connected into the circuit so as to be controlled by the signal through the channel of the amplifier operated by compass 10.

From the foregoing it will be seen that there has been provided an apparatus for reversibly controlling a motor operating at a first frequency when the controlling signals therefor are of the first frequency and of a different frequency. It will also be seen that an amplifier for reversibly energizing a controlled motor has been provided when that amplifier is energized by a power source of a first frequency and the control signals therefor are of the first and of a second frequency.

Though not intended to be interpreted as the only values of components which will operate in this circuit the following values constitute one set which were found to have operated satisfactorily.

| Component | Unit | Value |
|---|---|---|
| Resistors 27, 36, 96, 97, 115, 117, 123, 125, 156, 157, 194, 195, 235, 244, 247, 251 | megohms | 1 |
| Resistors 25, 190 | kilohms | 2.2 |
| Resistors 34, 200 | do | 6.8 |
| Resistors 66, 70, 91, 94, 203, 204 | do | 470 |
| Resistors 90, 93 | do | 47 |
| Resistors 231, 240 | do | 270 |
| Resistors 232, 241 | do | 100 |
| Resistor 56 | do | 3.5 |
| Resistor 62 | do | 20 |
| Potentiometer 180 | do | 1 |
| Capacitors 26, 76, 81, 193, 211, 216 | microfarads | 0.01 |
| Capacitors 35, 92, 95, 233, 242 | do | 0.25 |
| Capacitors 104, 106 | do | 0.02 |
| Capacitors 134, 140 | do | 2 |
| Capacitors 57, 64 | do | 10 |
| Capacitor 155 | do | 0.07 |
| Capacitor 181 | do | 0.23 |

It is to be understood that various modifications may readily appear to one skilled in the art. It is therefore intended that the scope of the invention be limited only by the appended claims, in which I claim:

I claim as my invention:

1. An electronic circuit having in combination: a source of voltage; a signal voltage; a first pair of electron discharge devices each having an anode, a cathode and a control electrode; means applying said signal voltage between said control electrodes and said cathodes; means placing voltages from said source between the anodes and cathodes of said devices; a second pair of discharge devices each having an anode, a cathode and a control electrode; means connecting said anodes and cathodes of said second pair of discharge devices across said source; means connecting the cathodes of said first pair of discharge devices to the control electrodes of said second pair of discharge devices; a third pair of electron discharge devices each having an anode, a cathode and a control electrode; a control device connected to the anode of each of said second pair of discharge devices; a circuit, said circuit comprising a motor that is energized upon the operation of one of said control devices, speed responsive means connected to said motor, said speed responsive means applying a voltage between the control electrodes and cathodes of said third pair of electron discharge devices; means connecting the anodes and cathodes of said third pair of electron discharge devices across said voltage source; and means connecting the anodes of said third pair of electron discharge devices to the control electrodes of said second pair of discharge devices such that the difference between the output voltages of said first pair of discharge devices and said third pair of discharge devices when applied between said control electrodes and cathodes of a second pair of discharge devices determines the effective voltage between said control electrodes and cathodes to cause intermittent operation of either of the discharge devices in said second pair depending upon the signal voltage.

2. An electronic circuit having in combination: a source of alternating voltage of a first frequency; a signal voltage of a second frequency; a first pair of electron discharge devices each having an anode, a cathode and a control electrode; means applying said signal voltage to said control electrodes such that the voltages on said control electrodes are in phase; means placing voltages from said source on said anodes of said devices such that the voltages on said anodes are in phase opposition; a second pair of discharge devices each having an anode, a cathode and a control electrode; means connecting said anodes of said second pair of discharge devices to said source such that the voltages on said anodes are in phase; means connecting the cathodes of said first pair of discharge devices to the control electrodes of said second pair of discharge devices; a third pair of electron discharge devices each having an anode, a cathode and a control electrode; a control device connected to the anode of each of said second pair of discharge devices; a circuit, said circuit comprising a motor that is energized upon the operation of one of said control devices, speed responsive means connected to said motor, said speed responsive means applying an alternating voltage of said first frequency on the control electrodes of said third pair of electron discharge devices; means connecting the anodes of said third pair of electron discharge devices to said voltage source such that the voltages on said anodes are in phase opposition; and means connecting the anodes of said third pair of electron discharge devices to the control electrodes of said second pair of discharge devices such that the difference between the output voltages of said first pair of discharge devices and said third pair of discharge devices when applied to said control electrodes determines the effective voltage on said control electrodes to cause intermittent operation of either of said second pair of discharge devices depending upon the signal voltage.

3. An electronic circuit having in combination: a source of alternating voltage; a signal voltage of twice the frequency of said source; a first pair of electron discharge devices each having an anode, a cathode and a control electrode; means applying said signal voltage to said control electrodes such that the voltages on said control electrodes are in phase; a full wave rectifier supplied by said source; a transformer; means connecting said rectifier output through said transformer to produce a voltage of twice the frequency of said source; means connecting the output of said transformer to the anodes of said devices such that the voltages on said anodes are in phase opposition; means, including said first pair of discharge devices for converting said signal voltage to unidirectional voltage; a second pair of discharge devices each having an anode, a cathode and a control electrode; means connecting said anodes of said second pair of discharge devices to said source such that the voltages on said anodes are in phase; means connecting the cathodes of said first pair of discharge devices to the control electrodes of said second pair of discharge devices; a third pair of electron discharge devices each having an anode, a cathode and a control electrode; a control device connected to the anode of each of said second pair of discharge devices; a circuit, said circuit comprising a motor that is energized upon the operation of one of said control devices, speed responsive means connected to said motor, said speed responsive means applying an alternating voltage on the control electrodes of said third pair of electron discharge devices; means connecting the anodes of said third pair of electron discharge devices to said voltage source such that the voltages on said anodes are in phase opposition; means, including said third pair of electron discharge devices, for converting the output voltage from said third pair of electron discharge devices to unidirectional voltage; and means connecting the anodes of said third pair of electron discharge devices to the control electrodes of said second pair of discharge devices such that the difference between the output voltages of said first pair of discharge devices and said third pair of discharge devices when applied to said control electrodes determines the effective voltage on said control electrodes to cause intermittent operation of either of the discharge devices of said second pair depending upon the signal voltage.

4. An electronic circuit having in combination: a source of alternating voltage; an alternating signal voltage; a first pair of electron discharge devices each having an anode, a cathode and a control electrode; means applying said signal voltage to said control electrodes such that the voltages on said control electrodes are in phase; means connecting said source of voltage to said anodes such that the voltages on said anodes are in phase opposition; a resistor in the cathode circuit of each discharge device; a capacitor connected across each of said resistors such that the voltage across said resistors upon operation of said devices is unidirectional voltage; a pair of gaseous discharge devices each having an anode, a cathode and a control electrode; means connecting said anodes of said gaseous discharge devices to said source such that the voltages on said anodes are in phase; means connecting the cathodes of said first pair of discharge devices to the control electrodes of said gaseous discharge devices; a second pair of electron discharge devices each having an anode, a cathode and a control electrode; a control device connected to the anode of each of said gaseous discharge devices; a circuit, operated upon energization of one of said control devices, which places an alternating voltage on the control electrodes of said second pair of electron discharge devices; means connecting the anodes of said second pair of electron discharge devices to said voltage source such that the voltages on said anodes are in phase opposition; a resistor in the anode circuit of each of said second pair of electron discharge devices; a capacitor connected across each of said resistors in the anode circuits of said second pair of electron discharge devices such that the voltage across said resistors upon operation of said devices is unidirectional voltage; and means connecting the anodes of said second pair of electron discharge devices to the control electrodes of said gaseous discharge devices such that the difference between the two unidirectional voltages on said control electrodes determines the effective voltage on said control electrodes to cause intermittent operation of either of said gaseous discharge devices depending upon the signal voltage.

5. An electronic circuit having in combination: a source of alternating voltage; a signal voltage of twice the frequency of said source; a first pair of electron discharge devices each having an anode, a cathode and a control electrode; means applying said signal voltage to said control electrodes such that the voltages on said control electrodes are in phase; a full wave rectifier supplied by said source; a transformer; means connecting said rectifier output through said transformer to produce a voltage of twice the frequency of said source; means connecting the output of said transformer to the anodes of said devices such that the voltages on said anodes are in phase opposition; a resistor in the cathode circuit of each discharge device; a capacitor connected across each of said resistors such that the voltage across said resistors upon operation of said devices is unidirectional voltage; a pair of gaseous discharge devices each having an anode, a cathode and a control electrode; means connecting said anodes of said gaseous discharge devices to said source such that the voltages on said anodes are in phase; means connecting the cathodes of said first pair of discharge devices to the control electrodes of said gaseous discharge devices; a second pair of electron discharge devices each having an anode, a cathode and a control electrode; a control device connected to the anode of each of said gaseous discharge devices; a circuit, operated upon energization of one of said control devices, which places an alternating voltage on the control electrodes of said second pair of electron discharge devices; means connecting the anodes of said second pair of electron discharge devices to said voltage source such that the voltages on said anodes are in phase opposition; a resistor in the anode circuit of each of said second pair of electron discharge devices; a capacitor connected across each of said resistors in the anode circuits of said second pair of electron discharge devices such that the voltage across said resistors upon operation of said devices is unidirectional voltage; and means connecting the anodes of said second pair of electron discharge devices to the control electrodes of said gaseous discharge devices such that the difference between the two unidirectional voltages on said control electrodes determines the effective voltage on said control electrodes to cause intermittent operation of either of said gaseous discharge devices depending upon the signal voltage.

6. An electronic circuit having in combination: a source of alternating voltage; a signal voltage of twice the frequency of said source; a first pair of electron discharge devices each having an anode, a cathode and a control electrode; means applying said signal voltage to said control electrodes such that the voltages on said control electrodes are in phase; a full wave rectifier supplied by said source; a transformer; means connecting said rectifier output through said transformer to produce a voltage of twice the frequency of said source; means connecting the output of said transformer to the anodes of said devices such that the voltages on said anodes are in phase opposition; a resistor in the cathode circuit of each discharge device; a capacitor connected across each of said resistors such that the voltage across said resistors upon operation of said devices is unidirectional voltage; a bias voltage on each of said control electrodes obtained by electrically connecting said control electrodes to the cathode circuits of the respective discharge devices; a pair of gaseous discharge devices each having an anode, a cathode and a control electrode; means connecting said anodes of said gaseous discharge devices to said source such that the voltages on said anodes are in phase; means connecting the cathodes of said first pair of discharge devices to the control electrodes of said gaseous discharge devices; a second pair of electron discharge devices each having an anode, a cathode and a control electrode; a control device connected to the anode of each of said gaseous discharge devices; a circiut, operated upon energization of one of said control devices, which places an alternating voltage on the control electrodes of said second pair of electron discharge devices; means connecting the anodes of said second pair of electron discharge devices to said voltage source such that the voltages on said anodes are in phase opposition; a resistor in the anode circuit of each of said second pair of electron discharge devices; a capacitor connected across each of said resistors in the anode circuits of said second pair of electron discharge devices such that the voltage across said resistors upon operation of said devices is unidirectional voltage; and means connecting the anodes of said second pair of electron discharge devices to the control electrodes of said gaseous discharge devices such that the difference between the two unidirectional voltages on said control electrodes determines the effective voltage on said control electrodes to cause intermittent operation of either of said gaseous discharge devices depending upon the signal voltage.

7. An electronic circuit having in combination: a source of voltage; a signal voltage; a first electron discharge device having an anode, a cathode and a control electrode; means applying said signal voltage to said control electrode; means placing a voltage from said source on the anode of said device; a second discharge device having an anode, a cathode and a control electrode; means connecting the anode of said second discharge device to said source; means connecting the cathode of said first discharge device to the control electrode of said second discharge device; a third electron discharge device having an anode, a cathode and a control electrode; a control device connected to the anode of said second discharge device; a circuit, said circuit comprising a motor that is energized upon the operation of said control device, speed responsive means connected to said motor, said speed responsive means applying a voltage on the control electrode of said third electron discharge device; means connecting the anode of said third electron discharge device to said voltage source; and means connecting the anode of said third electron discharge device to the control electrode of said second discharge device such that the difference between the output voltages of said first discharge device and said third discharge device when applied to said control electrode determines the effective voltage on said control electrode to cause intermittent operation of said second discharge device.

8. An electronic circuit having in combination: a source of alternating voltages; a signal voltage of twice the frequency of said source; a first electron discharge device having an anode, a cathode and a control electrode; means applying said signal voltage to said control electrode; a full wave rectifier supplied by said source; a transformer; means connecting said rectifier output through said transformer to produce a voltage of twice the frequency of said source; means connecting the output of said transformer to the anode of said device; means, including said first discharge device for converting said signal voltage to unidirectional voltage; a second discharge device having an anode, a cathode and a control electrode; means connecting said anode of said second discharge device to said source; means connecting the cathode of said first discharge device to the control electrode of said second discharge device; a third electron discharge device having an anode, a cathode and a control electrode; a control device connected to the anode of said second discharge device; a circuit, said circuit comprising a motor that is energized upon the operation of said control device, speed responsive means connected to said motor, said speed responsive means applying an alternating voltage on the control electrode of said third electron discharge device; means connecting the anode of said third electron discharge device to said voltage source; means, including said third electron discharge device, for converting the output voltage from said third electron discharge device to unidirectional voltage; and means connecting the anode of said third electron discharge device to the control electrode of said second discharge device such that the difference between the two voltages on said control electrode determines the effective voltage on said control electrode to cause intermittent operation of said second discharge device.

9. An electronic circuit having in combination: a source of alternating voltage; a signal voltage of twice the frequency of said source; a first electron discharge device having an anode, a cathode and a control electrode; means applying said signal voltage to said control electrode; a full wave rectifier supplied by said source; a transformer; means connecting said rectifier output through said transformer to produce a voltage of twice the frequency of said source; means connecting the output of said transformer to the anode of said device; a resistor in the cathode circuit of said discharge device; a capacitor connected across said resistor such that the voltage across said resistor upon operation of said device is unidirectional voltage; a gaseous discharge device having an anode, a cathode and a control electrode; means connecting said anode of said gaseous discharge device to said source; means connecting the cathode of said first discharge device to the control electrode of said gaseous discharge device; a second electron discharge device having an anode, a cathode and a control electrode; a control device connected to the anode of said gaseous discharge device; a circuit, operated upon energization of said control device, which places an alternating voltage on the control electrode of said second electron discharge device; means connecting the anode of said second electron discharge device to said voltage source; a resistor in the anode circuit of said second electron discharge device; a capacitor connected across said resistor in the anode circuit of said second electron discharge device such that the voltage across said resistor upon operation of said device is unidirectional voltage; and means connecting the anode of said second electron discharge device to the control electrode of said gaseous discharge device such that the difference between the two unidirectional voltages on said control electrode determines the effective voltage on said control electrode to cause intermittent operation of said gaseous discharge device.

10. Motor control apparatus, comprising in combination: a source of power varying at a first periodic rate; motor means adapted to be energized by a source of power varying at said first periodic rate; a condition responsive device adapted to indicate the need for operation of said motor means, said device having an output signal which varies at a second periodic rate; motor speed responsive means connected to said motor means, said speed responsive means having an output signal which varies at said first periodic rate; combining means including rectifying means for algebraically adding said signals to form a resultant unidirectional signal that has a characteristic dependent upon the relative values of said signals; and means associated with said combining means reversibly controlling the energization of said motor means from said source of power in accordance with said resultant unidirectional signal.

11. Motor control apparatus, comprising in combination: a source of power varying at a first periodic rate; motor means adapted to be energized by a source of power varying at said first periodic rate; a condition responsive device adapted to indicate the need for operation of said motor means, said device having an output signal which varies at a second periodic rate; motor speed responsive means connected to said motor means, said speed responsive means having an output signal which varies at said first periodic rate; combining means including rectifying means for algebraically adding said signals to form a resultant unidirectional signal that has a magnitude and polarity dependent upon the difference of the relative values of said signals; and means associated with said combining means reversibly controlling the energization of said motor means from said source of power in accordance with said resultant unidirectional signal, said motor means being operative upon said resultant unidirectional signal reaching a predetermined value.

12. Motor control apparatus, comprising in combination: a source of power varying at a first periodic rate; motor means adapted to be energized by a source of power varying at said first periodic rate; a condition responsive device adapted to indicate the need for operation of said motor means, said device having an output signal which varies at a second periodic rate; motor speed responsive means connected to said motor means, said speed responsive means having an output signal which varies at said first periodic rate; means for rectifying and combining said signals to form a combined unidirectional signal that has a characteristic dependent upon the relative values of said signals; electronic means for reversibly controlling the energization of said motor means from said source of power; and circuit means connecting said combined unidirectional signal to said electronic means to effect the controlling action of said motor means.

13. Motor control apparatus, comprising in combination: a source of power varying at a first periodic rate; motor means adapted to be energized by a source of power varying at said first periodic rate; a compass adapted to indicate the need for operation of said motor means, said compass having an output signal which varies at a second periodic rate; motor speed responsive means connected to said motor means, said speed responsive means having an output signal which varies at said first periodic rate; means for rectifying and combining said signals to form a combined unidirectional signal that has a magnitude and sense dependent upon the relative values and phases of said signals; biased electronic means for reversibly controlling the energization of said motor means from said source of power; and circuit means connecting said combined unidirectional signal to said biased electronic means to offset the controlling action of said motor means in accordance with the magnitude and sense of said combined unidirectional signal.

14. An electronic circuit having in combination: a source of supply voltage, said source having a frequency of a first value; a source of signal voltage, said signal source having a frequency of a second higher value; a pair of discharge devices each having an anode, a cathode, and a control electrode; means connecting said anodes and said cathodes across said supply voltage; a control device in the anode circuit of each of said discharge devices, said control device being effective to render a motor operative; means converting said signal voltage to a unidirectional voltage, the magnitude and direction of which depend upon the magnitude and phase of said signal voltage; means impressing said converted signal voltage between the control electrodes and cathodes of said discharge devices; motor speed responsive means actuated upon operation of one or the other of said control devices, said speed responsive means having an output voltage the frequency of which is the same as said first value; means converting said output voltage to a unidirectional voltage, the magnitude and direction of which depend upon the magnitude and phase of said output voltage; and means connecting said converted output voltage in opposition to said converted signal voltage between the control electrodes and cathodes of said discharge devices such that the difference of the two voltages across the control electrodes and cathodes determines the effective voltage between said control electrodes and cathodes to cause intermittent pulsations of either of said discharge devices depending upon the signal voltage.

15. An electronic circuit having in combination: a source of alternating supply voltage, said source having a frequency of a first value; a source of signal voltage of a frequency other than that of said supply voltage; a pair of discharge devices each having an anode, a cathode and a control electrode; means connecting said anodes and said cathodes across said supply voltage such that the voltages on said anodes with respect to said cathodes are of the same phase; means converting said signal voltage to unidirectional voltage, the magnitude and direction of which depend upon the magnitude and phase of said signal voltage; means impressing said converted signal voltage between said control electrodes and said cathodes; a control device in the anode circuit of each of said discharge devices, said control devices being effective to render a motor operative; motor speed responsive means having an output signal which has a frequency of said first value actuated upon operation of one of said control devices; means converting said signal voltage from said motor speed responsive means to a unidirectional voltage of opposite polarity of said signal converted voltage; and means impressing said last named unidirectional voltage between the control electrodes and cathodes of said discharge devices such that the difference of the two unidirectional voltages across the control electrodes and cathodes determines the effective voltage between said control electrodes and said cathodes to cause intermittent pulsations of either of said discharge devices depending upon the signal voltage.

16. An electronic circuit having in combination: a source of alternating supply voltage; a source of signal voltage of a frequency other than that of said supply voltage; a pair of discharge devices each having an anode, a cathode and a control electrode; means connecting said anodes and said cathodes across said supply voltage; a control device in the anode circuit of each of said discharge devices; means converting said signal voltage to unidirectional voltage, the magnitude and direction of which depend upon the magnitude and phase of said signal voltage; means impressing said converted signal voltage between said control electrodes and said cathodes to cause energization of only one of said discharge devices at a time; means energizing the control device in the anode circuit of the discharge device which is energized, said control devices being effective to render a motor operative; motor speed responsive means, actuated upon energization of one of said control devices and having an output signal which alternates at a frequency which is the same as that of said source of supply; means converting said output signal of said motor speed responsive means to a unidirectional voltage of opposite polarity of said converted signal voltage and of gradually increasing magnitude; and means impressing said last named unidirectional voltage between the control electrode and cathode of the energized discharge device to eventually overcome said converted signal voltage and cause de-energization of said discharge device and said control device, the interaction of said unidirectional voltages causing intermittent energization of the discharge device and control device.

17. An electronic circuit having in combination: a source of alternating supply voltage, said source having a frequency of a first value; a source of signal voltage having a frequency of a second higher value; a discharge device having an anode, a cathode and a control electrode; means connecting said anode to said supply voltage; a control device in the anode circuit of said discharge device; means converting said signal voltage to unidirectional voltage, the magnitude and direction of which depends upon the magnitude and phase of said signal voltage; means impressing said converted signal voltage on said control electrode; means energizing the control device in the anode circuit upon energization of the discharge device; electrical circuit means controlled by the energization of said control device and having an alternating signal which alternates at the same frequency as said supply voltage; means converting said alternating signal from said electrical circuit means to a unidirectional voltage of opposite polarity of said converted signal voltage and of gradually increasing magnitude; and means impressing said last named unidirectional voltage on the control electrode of the energized discharge device to eventually overcome said converted signal voltage and cause deenergization of said discharge device and said control device, the interaction of said unidirectional voltages resulting in intermittent operation of the discharge device and control device.

ROBERT R. CHAPMAN.

References Cited in the file of this patent

UNITED STATES PATENTS

| Number | Name | Date |
|---|---|---|
| 1,554,698 | Alexanderson | Sept. 22, 1925 |
| 2,115,086 | Riggs | Apr. 26, 1928 |
| 2,287,002 | Moseley | June 16, 1942 |
| 2,399,695 | Satterlee | May 7, 1946 |
| 2,409,970 | Agins | Oct. 22, 1946 |
| 2,466,035 | McCoy | Apr. 5, 1949 |
| 2,479,105 | Emerson | Aug. 16, 1949 |